United States Patent
Schulte, Jr. et al.

(10) Patent No.: US 7,063,214 B2
(45) Date of Patent: Jun. 20, 2006

(54) INTERLOCKING SCREENS FOR VIBRATORY SEPARATORS

(75) Inventors: David L. Schulte, Jr., Broussard, LA (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 122 days.

(21) Appl. No.: 10/359,733

(22) Filed: Feb. 4, 2003

(65) Prior Publication Data
US 2004/0149632 A1    Aug. 5, 2004

(51) Int. Cl.
*B07B 1/49* (2006.01)

(52) U.S. Cl. ............... 209/405; 209/408; 209/409; 209/411

(58) Field of Classification Search ........... 209/405, 209/408, 409, 411, 412
See application file for complete search history.

(56) References Cited

U.S. PATENT DOCUMENTS

| | | | |
|---|---|---|---|
| 1,174,539 A | 5/1912 | Bauer | |
| 1,279,630 A | 9/1918 | Yoder et al. | |
| 2,893,484 A | 7/1959 | Gordon | |
| 3,666,095 A | 5/1972 | Krynock et al. | 209/254 |
| 3,968,033 A | 7/1976 | Illemann et al. | 209/403 |
| 4,190,527 A | 2/1980 | Spiller | 209/363 |
| 4,661,245 A | 4/1987 | Rutherford et al. | 209/399 |
| D302,019 S | 7/1989 | Dehlen | D15/147 |
| 4,909,929 A | 3/1990 | Tabor | 209/400 |
| 5,248,043 A | 9/1993 | Dorn | 209/399 |
| 5,363,970 A | 11/1994 | Freissle | 209/399 |
| 5,551,575 A | 9/1996 | Leone | 209/273 |
| 5,735,409 A | 4/1998 | Mallmberg | 209/399 |
| 6,019,228 A | 2/2000 | Duggan | 209/408 |
| 6,439,392 B1 | 8/2002 | Baltzer | 209/405 |
| 6,443,310 B1 | 9/2002 | Schulte, Jr. et al. | 209/399 |
| 6,672,460 B1 | 1/2004 | Baltzer et al. | 209/403 |
| 6,708,829 B1 * | 3/2004 | Robertson et al. | 209/405 |
| 6,713,190 B1 | 3/2004 | Cook et al. | 428/608 |

FOREIGN PATENT DOCUMENTS

| | | |
|---|---|---|
| WO | WO 97/47404 | 6/1996 |
| WO | WO98/37988 | 2/1998 |
| WO | WO 92/00133 | 6/1999 |
| WO | WO 03/013690 | 8/2001 |

OTHER PUBLICATIONS

Int'l Search Report. PCT/GB2004/00423. mailed Aug. 6, 2004: 4 pp.
Written Opinion of the Int'l Searching Authority. PCT/GB/2004/000423: 4 pp. mailed Aug. 6, 2004.

* cited by examiner

*Primary Examiner*—Eileen D. Lillis
*Assistant Examiner*—Jonathan R. Miller
(74) *Attorney, Agent, or Firm*—Guy McClung

(57) ABSTRACT

Interconnectible screen assemblies for vibratory separators or shale shakers and methods for manipulating such screen assemblies which, in certain aspects, include a first screen assembly and a second screen assembly positioning at least a portion of the first screen assembly with respect to screen assembly holding apparatus, connecting a second screen assembly to the first screen assembly, and moving the first screen assembly and the second screen assembly together with respect to the screen assembly holding apparatus.

12 Claims, 6 Drawing Sheets

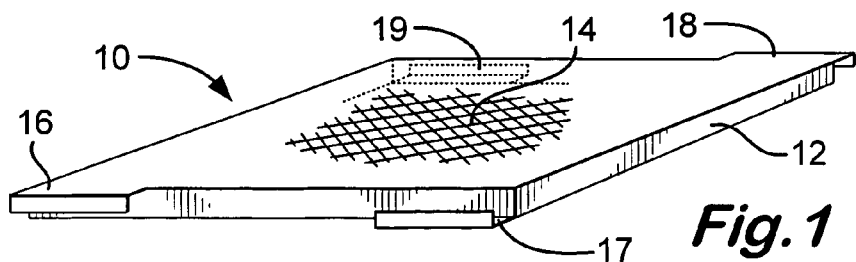
Fig. 1
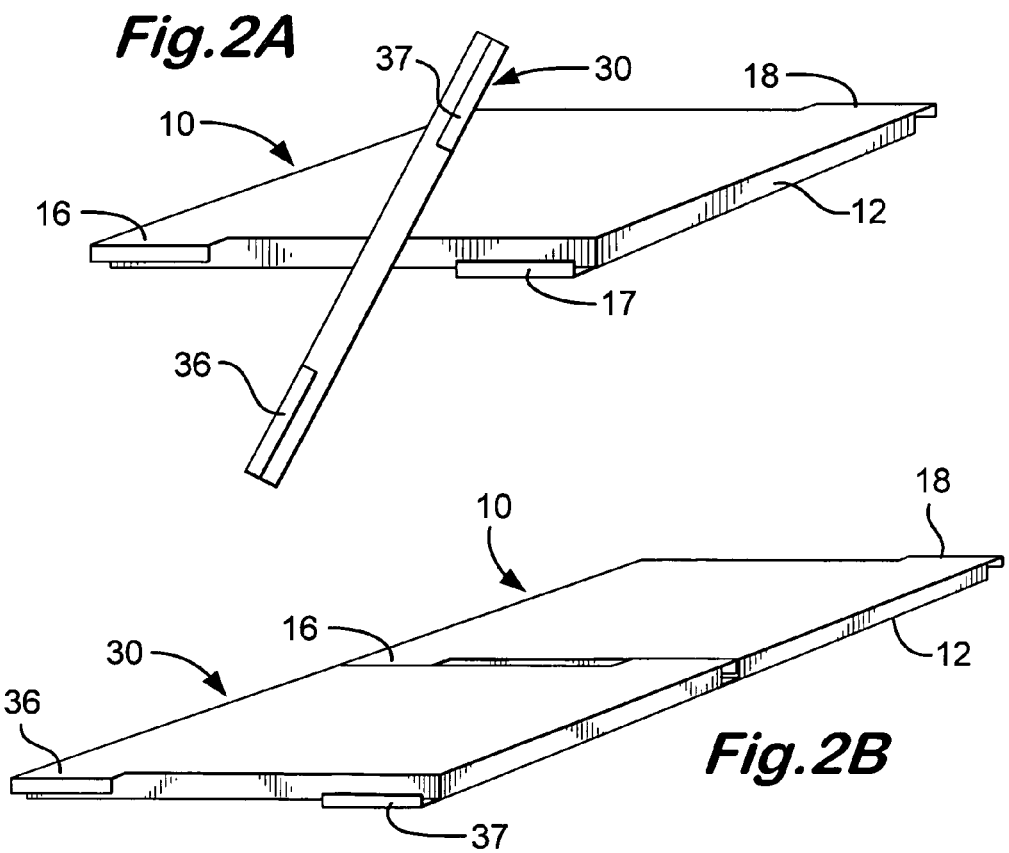
Fig. 2A
Fig. 2B
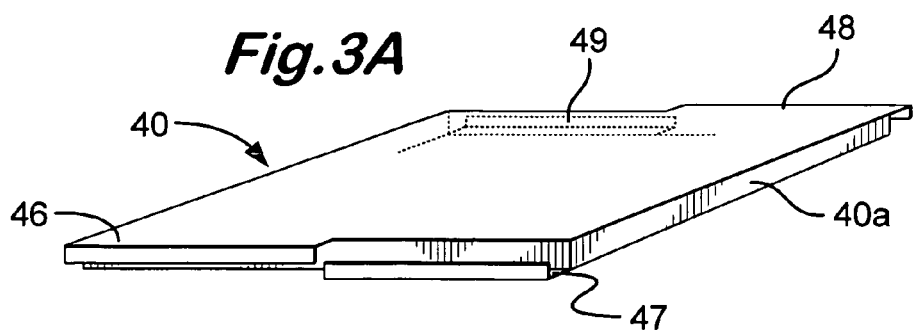
Fig. 3A

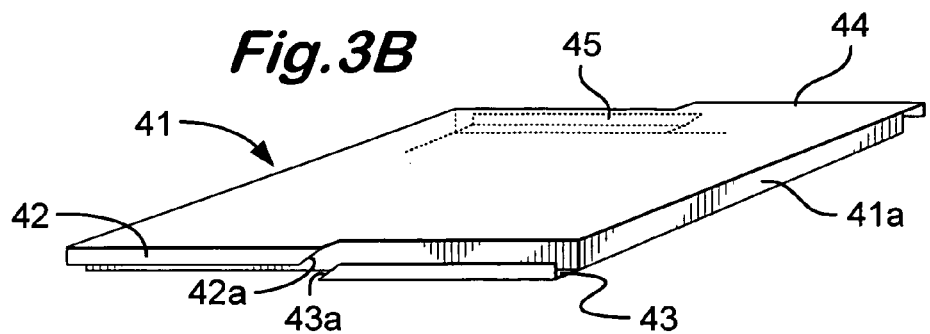
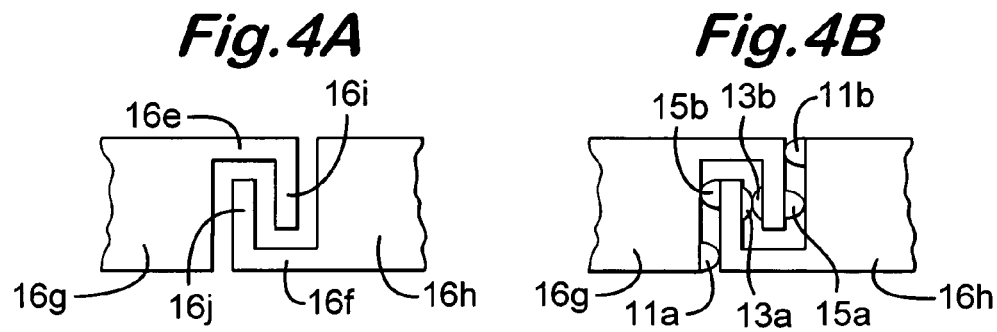
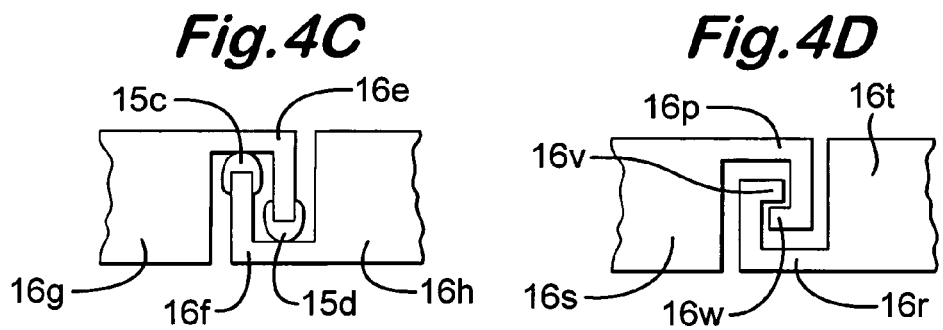
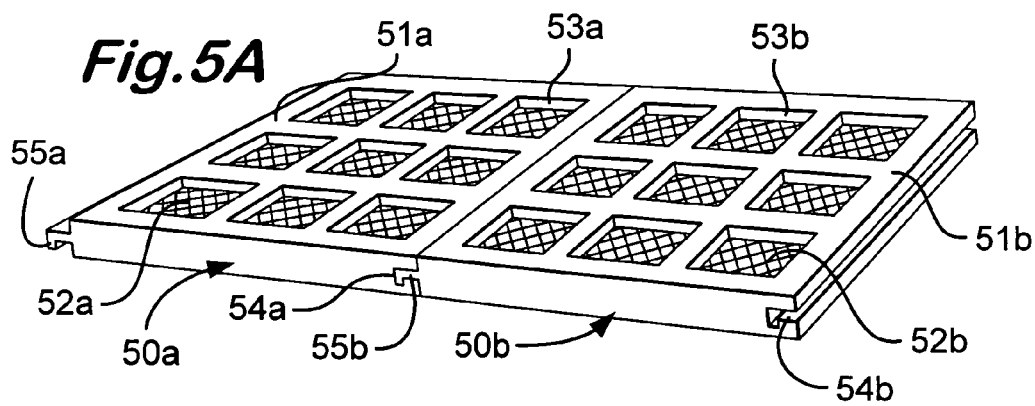
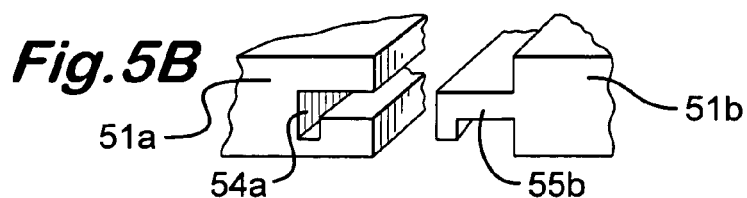

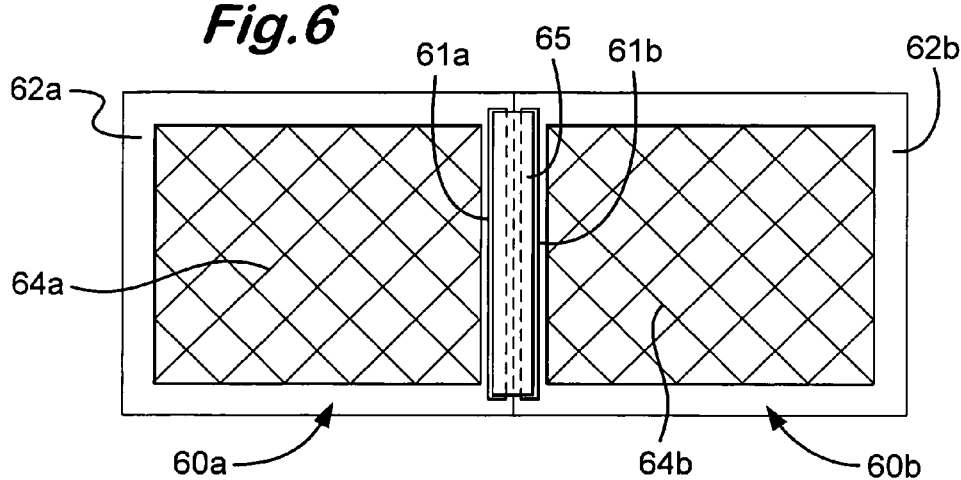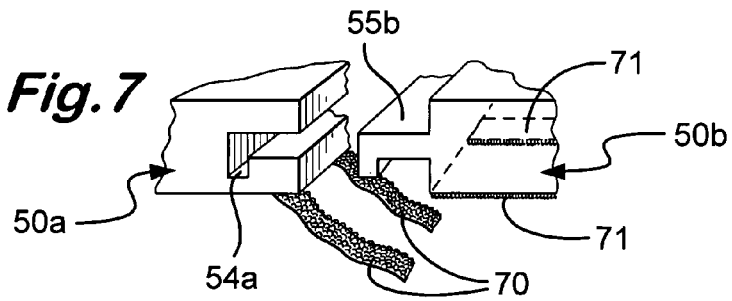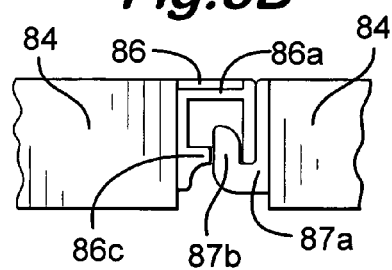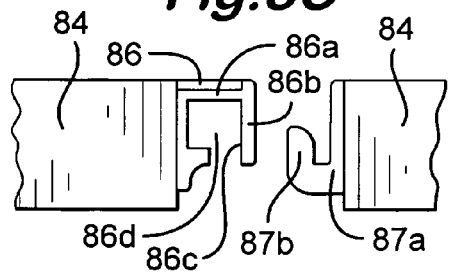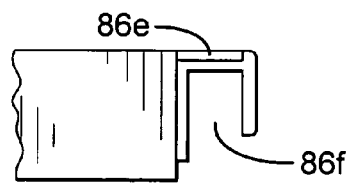

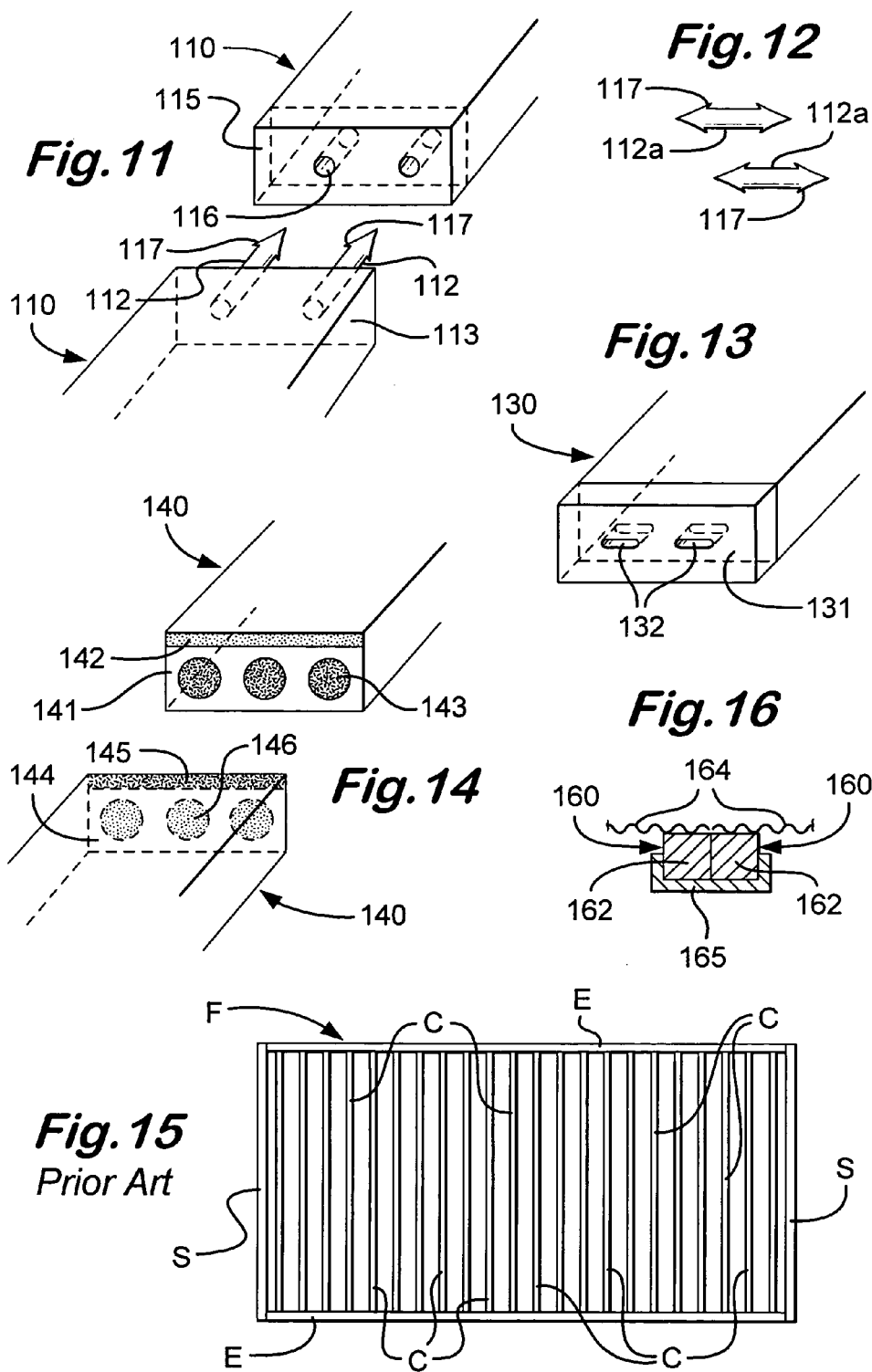

INTERLOCKING SCREENS FOR VIBRATORY SEPARATORS

BACKGROUND OF THE INVENTION

1. Field of the Invention

The present invention is directed to screen assemblies for vibratory separators and shale shakers and to methods of mounting them within and removing them from such separators and shakers.

2. Description of Related Art

The prior art discloses a variety of screen assembly mounting structures for holding screen assemblies in position. In many instances screen assemblies are positioned sequentially on or within mounting structures of a vibratory separator or shale shaker. For example, many such apparatuses have spaced apart channels into which screen assemblies are inserted one after the other and from which they are removed sequentially one at a time. Often removal of these screen assemblies can be difficult, particularly the removal of those farthest away from an insertion end of the mounting structure or fluid exit end of a support deck.

There has long been a need, recognized by the present inventors, for screen assemblies that are easily positionable on or within and removable from mounting structure within a separator or shaker. There has long been a need for such screen assemblies which do not require the individual removal of separate screen assemblies one at a time.

SUMMARY OF THE PRESENT INVENTION

The present invention, in certain embodiments, discloses systems and methods for positioning screen assemblies on or within screen mounting structures of vibratory separators or shale shakers and for facilitating the removal of screen assemblies from vibratory separators. In certain aspects, systems according to the present invention include screen assemblies with complimentary mating structure and/or apparatus that interconnects adjacent screen assemblies on or within separator or shaker screen mounting structure to facilitate their removal from the mounting structure. In certain particular aspects the mounting structure is a channel structure, including but not limited to, "C" or "U" channel mounts In other aspects, screens are positioned on a support deck and appropriate holding or wedging structure or devices are use to hold screen assemblies in place.

In certain embodiments adjacent screen assemblies are provided with releasable meshing, interconnecting, or interlocking parts so that removal of one of the screen assemblies results in the removal of one or more other interconnected screen assemblies from the mounting structure. In one particular aspect a first screen assembly has one or more spaced-apart lips and an adjacent screen assembly has one or more corresponding lips which are movable to interlock with the lip(s) of the first screen. In other aspects a first screen assembly has one or more recesses sized and configured for releasably holding corresponding projection(s) of a second adjacent screen assembly to releasably connect the two screen assemblies.

It is within the scope of the present invention to use releasably cooperating hook-and-loop material [e.g. VELCRO (Trademark) material] with or instead of any interconnecting or interlocking structure according to the present invention. In other embodiments a plug or pin extends into holes in two adjacent screens to releasably hold the screens together; or a plug or pin end which is an integral part of one screen assembly projects into a corresponding hole in an adjacent screen assembly to releasably secure the two screen assemblies together. In one particular aspect one or more movable VELCRO (Trademark) straps or pieces on one screen are releasably attached to one or more corresponding pieces of such material on an adjacent screen to releasably hold the two screens together.

It is, therefore, an object of at least certain preferred embodiments of the present invention to provide:

New, useful, unique, efficient, non-obvious systems and methods for releasably mounting screen assemblies in vibratory separators;

Such systems and methods which include interconnection of adjacent screen assemblies to enhance their stability on or within mounting structure and/or to facilitate their easy removal from such structure;

Such systems and methods that include releasable interlocking structure or apparatus for releasably holding adjacent screen assemblies together in a vibratory separator or shale shaker;

Such systems and methods that provide an enhanced sealing effect between adjacent screen assemblies; and Such systems and methods which provide correct foolproof positioning of screen assemblies in vibratory separators or shale shakers with no undesirable space between screen assemblies.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

FIG. 1 is a perspective view of a screen assembly according to the present invention.

FIG. 2A shows a step in the interconnection of two screen assemblies as in FIG. 1. FIG. 2B shows the two screen assemblies of FIG. 2A connected.

FIGS. 3A and 3B are perspective views of screen assemblies according to the present invention.

FIGS. 4A–4D show connection structures according to the present invention for screen assemblies according to the present invention.

FIG. 5A is a perspective view of a screen assembly according to the present invention. FIG. 5B is an enlargement of parts of the screen assemblies of FIG. 5A.

FIG. 6 is a top view of screen assemblies according to the present invention.

FIG. 7 is a perspective view of parts of screen assemblies according to the present invention.

FIGS. 8B and 8C are cross-section views of parts of two screen assemblies as in FIG. 8A. FIG. 8D is a partial cross-section view of a screen assembly according to the present invention.

FIG. 11 is a perspective view of screen assemblies according to the present invention.

FIG. 12 is a top view of connection pins for connecting screen assemblies according to the present invention.

FIG. 13 is a perspective view of a screen assembly according to the present invention.

FIG. 14 is a perspective view of screen assemblies according to the present invention.

FIG. 15 is a bottom view of a prior art support for screening material for a screen assembly.

FIG. 16 is a side cross-section view showing connecting according to the present invention of two screen assemblies as in FIG. 15.

DESCRIPTION OF EMBODIMENTS PREFERRED AT THE TIME OF FILING FOR THIS PATENT

Figure 8A:
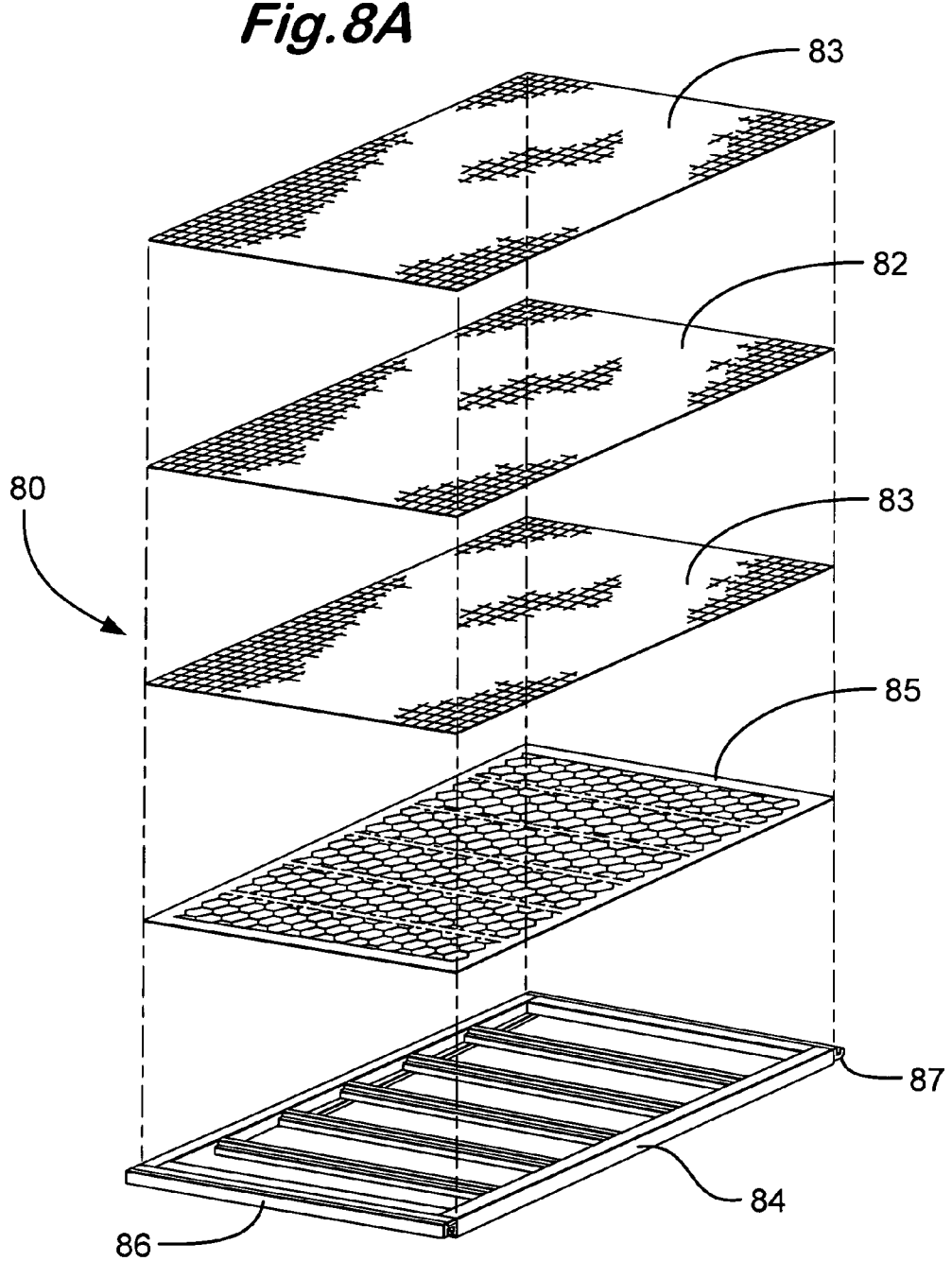
FIG. 8A is an exploded view of a screen assembly according to the present invention.

FIG. 1 shows schematically a screen assembly 10 according to the present invention for a vibratory separator or shale shaker which has a support or frame 12 with screening material 14. It is to be understood that it is within the scope of the present invention for side and/or cross members of the support or frame 12 to be like any such known support or frame members, including but not limited to, those of supports and frames in U.S. Pat. Nos. 5,417,793; 5,417,859; 5,417,858; 6,443,310; 6,439,392 and in the prior art cited therein. According to the present invention end members 16, 17, 18 and 19 of the frame 12 have lips 21 and 22 projecting therefrom. Each lip has a vertical portion (portions 16a, 17a and 18a shows in FIG. 1) connected to a horizontal portion (portions 16b, 17b, and 18b shown in FIG. 1). Such portions can be added to, secured to or formed integrally of any suitable known support or frame member to effect a frame or support according to the present invention. Alternatively, the lips may be generally curved with no portion at an abrupt angle to the other.

It is to be understood that the screening material 14 may be any known screening material of single or multiple layers of any known material [e.g. metal, metal alloy (e.g., brass, bronze) plastic, fiberglass, PTFE, composite) and may extend over an entire upper surface of the support or frame 12, with multiple layers fused, sewed, bonded, adhered, sintered, welded, and/or glued together at discrete points, along lines, and/or across substantially the entire surface area of the screening material.

As shown in FIGS. 2A and 2B the screen assembly 10 can be interconnected with a similar screen assembly 30 by juxtaposing the screen assemblies as shown in FIG. 2A and then moving them into position with respect to each other as shown in FIG. 2B with lips 16 and a corresponding lip of the screen assembly 30 (not shown) interengaging each other and lips 17 and a corresponding lip of the screen assembly 30 (not shown) interengaging each other. The screen assembly 30 has lips 36 and 37 (like the lips 16, 36 of the screen assembly 10) which are visible in the views of FIGS. 2A and 2B and lips not shown like the lips 18, 19.

With corresponding lips engaged as in FIG. 2B, moving the screen assembly 30 results in moving of the screen assembly 10 so that, when the screen assemblies are positioned on a support deck or in a mounting structure of a separator or shaker, pulling on the screen assembly closest to an end of the shaker or separator or closest to an entry insertion end of mounting structure results in pulling the screen assembly that is connected to the screen assembly being pulled. Prior to emplacement of or insertion of a second screen assembly according to the present invention (like the screen assembly 30), when a first screen assembly according to the present invention is either wholly or partially emplaced on or inserted into mounting structure, the second screen assembly is connected to the first screen assembly and pushing on the second screen assembly pushes the first screen assembly further onto a deck or into mounting structure while the first screen assembly remains connected to the second screen assembly. The second screen assembly is then moved to its desired position on the deck or within the mounting structure.

FIGS. 3A and 3B show screen assemblies according to the present invention with different engaging lip configurations. A screen assembly 40 shown in FIG. 3A has engaging lips 46, 47, 48 and 49 (like the lips 16–19, FIG. 1) but which have a greater linear extent so that, when two similar screen assemblies are connected (as are the two screen assemblies in FIG. 2B) there is little or no gap between a portion 46a of the lip 46 and an adjacent portion of an adjacent lip that is engaging the lip 47. Two screen assemblies like the screen assembly 40 may be connected by aligning lips of the two screen assemblies and sliding them together so that corresponding lips engage each other; or, if the lips are made of sufficiently flexible material, the lips can be flexed and moved together to effect desired interengagement.

FIG. 3B shows a screen assembly 41 with lips 42, 43, 44 and 45 (like lips of the screen assemblies of FIGS. 1 and 3A) but which has an inclined edge, e.g. 42a, 43a, on each lip with sufficient space therebetween so that two screens with such lips can be connected either by aligning lips and sliding screens together or by manipulating two such screens as shown in FIG. 2A. Frames 40a and 41a, respectively, may be like any of the supports or frames 12, FIG. 1; and any screening material, like any of the screening material 14, FIG. 1, may be used on the screening assemblies 40 and 41.

FIG. 4A shows the interengagement of two lips 16e, 16f (like the lips 16 and 17, respectively, FIG. 1) of screen assemblies 16g, 16h, respectively (shown partially). In use, the lip 16e may be moved to abut the screen assembly 16h and/or the lip 16f may abut the screen assembly 16g. To remove such screen assemblies from a screen assembly mounting structure or deck, pulling on the screen assembly 16g brings a vertical portion 16i of the lip 16e into contact with a vertical portion 16j of the lip 16f so that pulling the screen assembly 16g results in pulling of the screen assembly 16h.

FIG. 4B illustrates optional seal members 11a, 11b, 13a, 13b, 15a, and 15b which may be used on the lips and screen assemblies of FIG. 4A (and which may, according to the present invention, be used on any lip or lip portion or screen assembly part of a screen assembly according to the present invention). Any known seal or gasket material may be used for any of these seals including, but not limited to, metal, plastic, rubber, fiberglass, PTFE, and composite materials. The seals may be positioned so that a seal is connected to part of a lip or screen assembly and touches an opposing part of a lip or screen assembly (e.g. seals 11a, 15b, 15a, 11b) or seals can be positioned so that one seal contacts another seal (e.g. seals 13a, 13b). Seals may be discrete seal portions and parts and there may be, in certain aspects according to the present invention, a plurality of adjacent and/or spaced-apart seals; or a seal may extend along and completely cover or encompass an entire edge of a lip or an entire gap or interface area between parts. FIG. 4C shows seals 15c, 15d on end edges 16k, 16m of lips 16e, 16f.

FIG. 4D shows alternative embodiments 16p, 16r, for screen assemblies 16s, 16t which are like lips 16e, 16f (FIG. 4A), but which have horizontal portions 16v, 16w (horizontal as viewed in FIG. 4D) which provide additional interengaging portions for the lips. Any lip of any screen assembly according to the present invention may have portions like the portions 16v, 16w.

FIGS. 5A and 5B show screen assemblies 50a and 50b according to the present invention, each of which has a frame 51a, 51b, respectively, with screening material 52a, 52b, respectively secured thereto and exposed within a plurality of frame openings 53a, 53b, respectively. Each frame 51a, 51b has a recess 54a, 54b, respectively, for receiving and holding a corresponding connection member 55a, 55b, respectively. The two screen assemblies 50a and 50b are connected together by sliding the connection member 55b into the recess 54a. The screen assemblies 50a, 50b and their parts (as with any screen assemblies according to the present invention) may be made of any materials mentioned above for the items of FIGS. 1–4D.

FIG. 6 shows screen assemblies 60a, 60b according to the present invention each of which has a frame 62a, 62b (which may be like any support or frame of the screen assemblies of FIGS. 1–5A) with screening material 64a, 64b, respectively, which may be like any screening material described herein for any screen assembly according to the present invention. Each screen assembly 60a, 60b, has a portion of releasably cooperating hook-and-loop fastener material 61a, 61b, respectively, [e.g. VELCRO (trademark) material] to which is releasably attachable a piece of corresponding releasably cooperating fastener material 65 to releasably connect the two screen assemblies 60a, 60b together. Each of the screen assemblies 60a, 60b may also have any screen assembly interconnection apparatus and/or structure disclosed herein. The material 65 is shown as extending over almost all of an interface between the two screen assemblies 60a, 60b; but it is within the scope of this invention to use a similar piece of such material, multiple spaced-apart pieces, or one or more pieces to completely cover the interface and such material may also serve to close off the interface so nothing can flow between the screen assemblies (and such material may be used with any screen assemblies according to the present invention). The material shown in FIG. 6 may be used on the top and/or on the bottom of adjacent screen assemblies.

FIG. 7 shows the screen assemblies 50a, 50b of FIG. 5A with movable straps 70 of releasably cooperating fastener material on the screen assembly 50a which are movable to contact and cooperate with amounts 71 of such material in corresponding positions on the screen assembly 50b to releasably connect the two screen assemblies together. One, two, three, four or more of these straps may be used on any screen assembly according to the present invention.

FIGS. 8A–8C show a screen assembly 80 which is similar to those disclosed in U.S. Pat. No. 6,439,392 issued Aug. 27, 2002 (incorporated fully herein for all purposes); but which has screen interconnection structures at both ends of the screen assembly so that two adjacent screen assemblies 80 may be interconnected for movement (pushing, pulling) with respect to screen mounting structure of a separator or shaker. The screen assembly 80 has a frame 84 on which are mounted and secured, optionally, a perforated plate 85, and one, two, three, or more layers 81, 82, 83 of screening material (which may be any screening material disclosed herein, including, but not limited to the screening material 14, FIG. 1, and its various aspects and embodiments). Any frame or support members disclosed or described herein may be used for the members of the frame 82 and any support or plate may be used for the optional perforated plate 85. The frame 84 has a connector 86 at one end and corresponding connection structure 87 at the other end. The connector 86 has a body 86a with a lip 86b, an opening 86c, and an inner space 86d. The connector structure 87 has a body 87a with a lip 87b that is sized and configured for insertion into and through an opening 86c. As with any connection structure disclosed herein, the connector 86 and the connection structure 87 may be made of the same material as the frame 84 or of different material and be connected to or formed integrally of the frame 84.

Figure 9A:
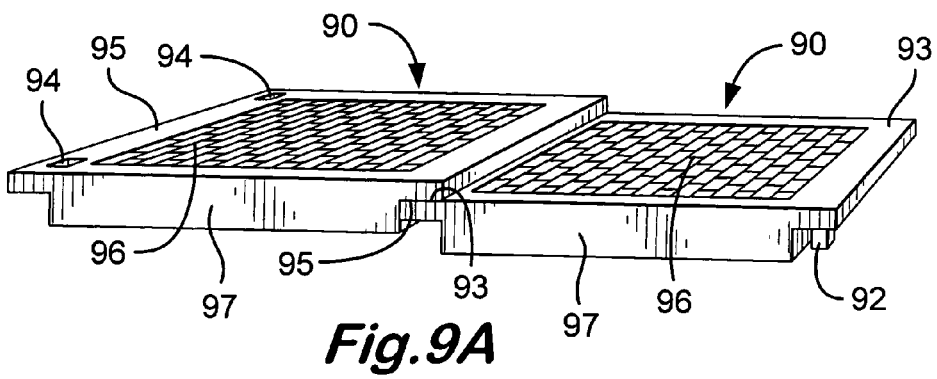
FIG. 9A is a perspective view of two screen assemblies according to the present invention.
Figures 9B, 9C:
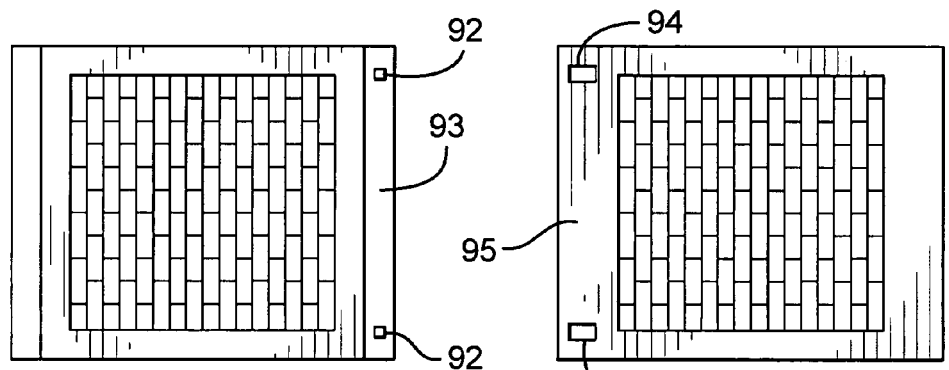
FIG. 9B is a bottom view of one of the screen assemblies of FIG. 9A.
FIG. 9C is a top view of one of the screen assemblies of FIG. 9A.

FIG. 8B shows the lip 87b engaged with the connector 86 and projecting into the space 86d. FIG. 8D shows an alternative embodiment 86e for the connector 86 in which an opening 86f is larger than the opening 86c to facilitate insertion of a lip 87b. according to the present invention FIGS. 9A and 9B show screen assemblies 90 according to the present invention which are like screen assemblies disclosed in U.S. Pat. No. 6,443,310 issued Sep. 3, 2002 (and incorporated fully herein for all purposes); but which have downwardly projecting pins 92 projecting down from a bottom of a screen side 93 which are sized and configured for releasable receipt within corresponding recesses 94 in a top of a screen side 95. One, two, three, four or more pins 92 with corresponding recesses 94 may be used (and may be used on any screen assembly disclosed herein according to the present invention) to provide for interconnection of two screen assemblies. Screening material 96 on frames 97 is like the screening material 14, FIG. 1.

Figure 10A:
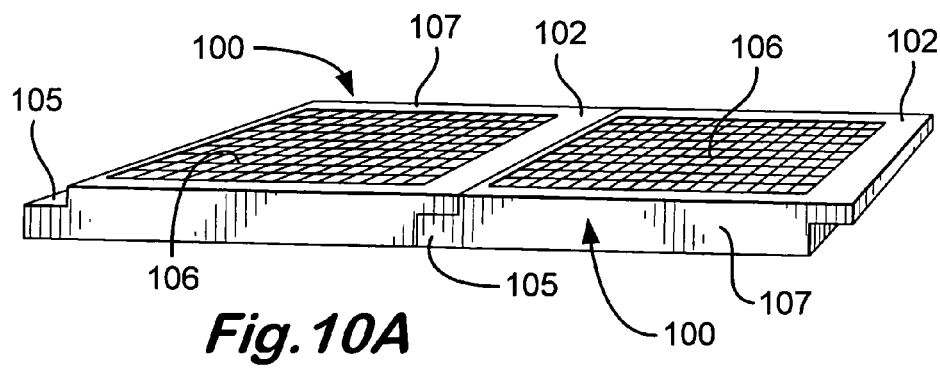
FIG. 10A is a perspective view of two screen assemblies according to the present invention.
Figure 10B:
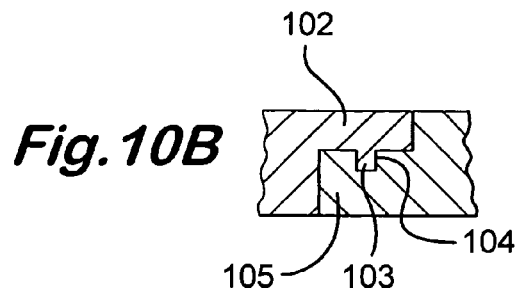
FIG. 10B is a side cross-section view of the screen assemblies of FIG. 10A.

FIGS. 10A and 10B show screen assemblies 100 according to the present invention each of which has a side 102 with one, two, three (or more) downwardly projecting pins 103 which are received and releasably held in corresponding interior recesses 104 in a side 105. Screening material 106 on frames 107 is like the screening material 14, FIG. 1.

FIG. 11 shows schematically screen assemblies 110 (each shown partially) with end members having one, two, three or more projecting pins 112 on one end 113 thereof and an opposing end 115 thereof having corresponding holes 116 for releasably receiving the pins 112. The pins 112 may have laterally projecting or "barbed" portions 117 to facilitate holding of the pins 112 within the holes 116. The pins 112 may be connected to or formed integrally of the screen assemblies 110; or, as illustrated in FIG. 12, separate separable pins 112a may be used with screen assemblies both ends of which have holes like the holes 116, according to the present invention. Barbed portions 117 may be deleted and the pins held in place with a friction fit and/or adhesive or glue. Instead of pins like the pins 112 or 112a, bolts, screws, or nut/bolt combinations may be used to connect screens together.

It is within the scope of this invention to provide a screen assembly (like any disclosed or referred to herein) with one or more pins like the pins 92 or the pins 103 which are positioned so that the pin(s) are received within a corresponding hole or recess in a basket, support deck, or screen assembly mounting structure to provide for correct positioning of a screen assembly and/or to stabilize a screen assembly during positioning and during separator or shaker operation. The pin(s) may have a uniform diameter or they may be tapered and correspondingly tapered holes or recesses may be used.

FIG. 13 shows an end 131 of a screen assembly 130 according to the present invention which has two slots 132 therethrough for receiving a part of a tool insertable therein to facilitate movement of the screen assembly with respect to a support deck or mounting structure. Alternatively, pins may be used in the slots 132 (like the pins of FIG. 12).

FIG. 14 shows schematically and partially two screen assemblies 140 according to the present invention which have at a first end 141 amounts of releasably cooperating fastener material 142 and 143 and at another end 144 corresponding amounts of such material 145 and 146 to releasably connect the screen assemblies together. The amounts 142 and 145 of material may also serve to close off and/or seal the interface between two screen assemblies 140 placed end-to-end in or on separator or shaker mounting structure.

It is to be understood that it is within the scope of the present invention for any screen assembly according to the present invention disclosed herein to have the connection structure and/or material disclosed in FIGS. 11–14.

FIG. 15 shows a prior art tubular frame F for a screen assembly which has ends E, sides S, and crossmembers C. FIG. 16 shows partially adjacent screen assemblies 160 according to the present invention each with a frame 162 like the frame F with screening material 164 (like the screening material 14, FIG. 1) on the frame 162. A clip 165 engages portions of frame end members of each adjacent frame 162 and releasably holds together the two screen assemblies 160 so that movement (pulling, pushing) of one results in corresponding movement of the other, e.g., with respect to (and onto, into or out of) screen assembly mounting structure or support deck of a separator or shaker. The clips 165 may be made of any suitable material, including any of those mentioned herein for screen assemblies or parts thereof.

The present invention, therefore, in at least certain aspects or embodiments, provides a method for manipulating a first screen assembly and a second screen assembly with respect to a screen assembly holding apparatus of a vibratory separator (e.g., but not limited to a shale shaker) into or onto which the screen assemblies are mountable, the method including positioning at least a portion of a first screen assembly with respect to screen assembly holding apparatus of a vibratory separator, connecting a second screen assembly to the first screen assembly, and moving the first screen assembly and the second screen assembly together with respect to the screen assembly holding apparatus. Such a method may include one or some (in any possible combination) of the following: wherein first and second screen assemblies are insertable into the screen assembly holding apparatus and the method further includes moving the first screen assembly to insert the first screen assembly and the second screen assembly (or parts thereof) into the screen assembly holding apparatus; moving the first screen assembly to remove both the first screen assembly and the second screen assembly (or part thereof) from the screen assembly holding apparatus; wherein the screen assembly holding apparatus includes a support deck and the first and second screen assemblies are emplaceable on the support deck, the method further includes moving the first screen assembly to move together the first screen assembly and the second screen assembly on or onto the support deck; moving the first screen assembly to remove the first screen assembly from the support deck and to move all or at least a portion of the second screen assembly to facilitate removal of the second screen assembly from the support deck; removing the first screen assembly from the screen assembly holding apparatus and thereby pulling the second screen assembly with respect to the screen assembly holding apparatus with the first screen assembly to facilitate removal of the second screen assembly from screen assembly holding apparatus; wherein the vibratory separator is a shale shaker for processing drilling fluid with solids entrained therein; wherein the first screen assembly and the second screen assembly each have interconnection apparatus thereon for releasably interconnecting the first screen assembly with the second screen assembly; wherein the interconnection apparatus includes at least one lip on each screen assembly, the at least one lip configured and positioned for engagement by a corresponding adjacent lip to releasably interconnect the screen assemblies, the method further includes engaging the at least one lip on the first screen assembly with the at least one lip on the second screen assembly to releasably connect the screen assemblies together; wherein each lip has at least one seal apparatus thereon for sealing an interface between the at least one lip of the first screen assembly and the at least one lip of the second screen assembly, or for sealing a lip/screen assembly interface; wherein the at least one lip on the first screen assembly is two spaced-apart lips thereon and the at least one lip on the second screen assembly is two corresponding spaced-apart lips thereon; wherein each lip has a length, each lip is connected to a side of a screen assembly that has a length, the lengths of the sides of the screen assemblies being substantially equal, and a combined length of adjacent lips upon interconnection of the two screen assemblies is substantially equal to the length of one of said sides of the screen assemblies; wherein the lips of the screen assemblies are sized so that upon interengagement of the lips of the two screen assemblies there is a gap between the lips; wherein the lips of the screen assemblies are sized so that upon interengagement of the lips of the two screen assemblies there is a no gap or almost no gap between the lips; wherein the interconnection apparatus includes at least one piece of releasably cooperating fastener material on each screen assembly, the at least one piece of releasably cooperating fastener material configured and positioned to releasably interconnect the screen assemblies, the method further includes connecting the first screen assembly to the second screen assembly by bringing into connecting contact the at least one piece of releasably cooperating fastener material on the first screen assembly with the at least one piece of releasably cooperating fastener material on the second screen assembly; wherein the screen assembly holding apparatus includes opposed channel members, each channel member having an opening defined by parts of the channel member, the screen assemblies insertable into the openings; wherein the screen assembly holding apparatus includes a support deck on which the screen assemblies are emplaceable and securement apparatus for securing the screen assemblies in place on the support deck, the method further includes emplacing the screen assemblies on the support deck, and securing the screen assemblies in place with the securement apparatus; wherein the first screen assembly and the second screen assembly each have interconnection apparatus thereon for interconnecting the first screen assembly with the second screen assembly, the interconnection apparatus is at least one strap on the first screen assembly, the at least one strap including releasably cooperating fastener material, and at least one corresponding amount of releasably cooperating fastener material on the second screen assembly, the method further includes connecting the at least one strap to the at least one corresponding amount of releasably cooperating fastener material to releasably connect the two screen assemblies together; wherein the interconnection apparatus is at least one pin projecting from the first screen assembly and at least one corresponding recess on the second screen assembly for releasably holding the at least one pin, the method further includes inserting the at least one pin into the at least one corresponding recess to releasably connect the screen assemblies together; wherein the at least one pin is formed integrally of the first screen assembly; and/or wherein the interconnection apparatus is at least one clip, the at least one clip configured for emplacement around a portion of each screen assembly, the method further includes connecting the two screen assemblies together with the at least one clip.

The present invention also provides a method for manipulating a first screen assembly and a second screen assembly with respect to a screen assembly holding apparatus of a vibratory separator into or onto which the screen assemblies are mountable, the method includes positioning at least a portion of a first screen assembly with respect to screen assembly holding apparatus of a vibratory separator, connecting a second screen assembly to the first screen assembly, and moving the first screen assembly and the second screen assembly together with respect to the screen assembly holding apparatus, wherein the first screen assembly and the second screen assembly each have interconnection apparatus thereon for interconnecting the first screen assembly with the second screen assembly, wherein the interconnection apparatus includes at least one lip on each screen assembly, the at least one lip configured and positioned for engagement by a corresponding adjacent lip to releasably interconnect the screen assemblies, the method further includes engaging the at least one lip on the first screen assembly with the at least one lip on the second screen assembly to releasably connect the screen assemblies together, wherein the at least one lip on the first screen assembly is two spaced-apart lips thereon and the at least one lip on the second screen assembly is two corresponding spaced-apart lips thereon, wherein the screen assembly holding apparatus has opposed channel members, each channel member having an opening defined by parts of the channel member, the screen assemblies insertable into said openings.

The present invention provides, therefore in at least certain aspects or embodiments, a screen assembly for use in treating fluid in a vibratory separator, the screen assembly having screening material, a support supporting the screening material, interconnection apparatus on the support for releasably connecting the screen assembly to an adjacent screen assembly. Such a screen assembly may have one or some (in any possible combination) of the following: wherein the interconnection apparatus has at least one lip projecting out from the support; at least one seal member on the at least one lip; wherein the at least one lip is two spaced-apart lips; wherein the two spaced-apart lips are of sufficient length that a gap or no gap is present upon engagement of similar lips of a similar adjacent screen assembly; the interconnection apparatus has an amount of releasably cooperating fastener material; wherein the amount of releasably cooperating fastener material is sufficiently large to cover an interface between the screen assembly and an adjacent screen assembly; the interconnection apparatus is at least one pin projecting from the support for releasable receipt within a corresponding hole of an adjacent screen assembly.

The present invention provides, therefore in at least certain aspects or embodiments, a screen assembly with a screening material support with at least one opening in the support for releasably receiving part of a tool useful for moving the screen assembly.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. Any patent or patent application referred to herein is incorporated fully herein for all purposes. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims. All patents referred to herein are incorporated fully herein for all purposes.

What is claimed is:

1. A method for manipulating a first screen assembly and a second screen assembly with respect to a screen assembly holding apparatus of a vibratory separator on which the screen assemblies are mountable; each screen assembly comprising screening material, a support supporting the screening material, an interconnection apparatus on the support for releasably connecting the screen assembly to an adjacent screen assembly, wherein the interconnection apparatus comprises a first lip projecting out from the support and a second lip projecting out from the support, the first lip spaced-apart from the second lip, the first lip having an upwardly projecting portion, the second lip having a downwardly projecting portion, the first lip's upwardly projecting portion located for engagement by a corresponding downwardly projecting lip portion of an adjacent screen assembly, and the second lip's downwardly projecting portion located for engagement by a corresponding upwardly projecting portion of an adjacent screen assembly, the method comprising positioning at least a portion of the first screen assembly with respect to screen assembly holding apparatus of a vibratory separator, connecting the second screen assembly to the first screen assembly by engaging the upwardly projecting lip portion of the first screen assembly with the downwardly projecting lip portion of the second screen assembly and by engaging the downwardly projecting lip portion of the first screen assembly with the upwardly projecting lip portion of the second screen assembly, and moving the first screen assembly and the second screen assembly together with respect to the screen assembly holding apparatus.

2. The method of claim 1 wherein first and second screen assemblies are insertable into the screen assembly holding apparatus and the method further comprises moving the first screen assembly to move both the first screen assembly and the second screen assembly into the screen assembly holding apparatus.

3. The method of claim 2 further comprising
moving the first screen assembly to remove both the first screen assembly and the second screen assembly from the screen assembly holding apparatus.

4. The method of claim 1 wherein the screen assembly holding apparatus includes a support deck and the first and second screen assemblies are emplaceable on the support deck, the method further comprising
moving the first screen assembly to move together the first screen assembly and the second screen assembly onto the support deck.

5. The method of claim 4 further comprising
moving the first screen assembly to remove the first screen assembly from the support deck and to move at least a portion of the second screen assembly to facilitate removal of the second screen assembly from the support deck.

6. The method of claim 1 further comprising
removing the first screen assembly from the screen assembly holding apparatus and thereby pulling the second screen assembly with respect to the screen assembly holding apparatus with the first screen assembly to facilitate removal of the second screen assembly from screen assembly holding apparatus.

7. The method of claim 1 wherein the vibratory separator is a shale shaker for processing drilling fluid with solids entrained therein.

8. The method of claim 1 wherein each lip has a length, each lip is connected to a side of a screen assembly that has a length, the lengths of the sides of the screen assemblies being substantially equal, and a combined length of adjacent lips upon interconnection of the two screen assemblies is substantially equal to the length of one of said sides of the screen assemblies.

9. The method of claim 1 wherein the lips of the screen assemblies are sized so that upon interengagement of the lips of the two screen assemblies there is a no gap between the lips.

10. The method of claim 1 wherein each screen assembly includes at least one piece of releasably cooperating fastener material on each screen assembly, the at least one piece of releasably cooperating fastener material configured and positioned to releasably interconnect the screen assemblies, the method further comprising
connecting the first screen assembly to the second screen assembly by bringing into connecting contact the at least one piece of releasably cooperating fastener material on the first screen assembly with the at least one piece of releasably cooperating fastener material on the second screen assembly.

11. The method of claim 1 wherein the screen assembly holding apparatus includes a support deck on which the screen assemblies are emplaceable and a securement apparatus for securing the screen assemblies in place on the support deck, the method further comprising
emplacing the screen assemblies on the support deck, and
securing the screen assemblies in place with the securement apparatus.

12. The method of claim 1 wherein the first screen assembly and the second screen assembly each have interconnection apparatus thereon for interconnecting the first screen assembly with the second screen assembly, the interconnection apparatus further comprising at least one strap on the first screen assembly, the at least one strap including releasably cooperating fastener material, and at least one corresponding amount of releasably cooperating fastener material on the second screen assembly, the method further comprising
connecting the at least one strap to the at least one corresponding amount of releasably cooperating fastener material to further releasably connect the two screen assemblies together.

\* \* \* \* \*